US011470234B2

(12) United States Patent
Liao et al.

(10) Patent No.: US 11,470,234 B2
(45) Date of Patent: Oct. 11, 2022

(54) WIRELESS CAMERA AND METHOD OF VIDEO STREAMING

(71) Applicant: AVer Information Inc., New Taipei (TW)

(72) Inventors: Jhan-Jhang Liao, New Taipei (TW); Chia-Feng Wu, New Taipei (TW); Cheng-Cheng Yu, New Taipei (TW)

(73) Assignee: AVer Information Inc., New Taipei (TW)

( * ) Notice: Subject to any disclaimer, the term of this patent is extended or adjusted under 35 U.S.C. 154(b) by 379 days.

(21) Appl. No.: 16/592,749

(22) Filed: Oct. 3, 2019

(65) Prior Publication Data

US 2020/0336647 A1   Oct. 22, 2020

(30) Foreign Application Priority Data

Apr. 22, 2019  (TW) .................................. 108114025

(51) Int. Cl.
*H04N 5/232* (2006.01)
*H04W 76/10* (2018.01)
*G06F 13/00* (2006.01)
*H04L 67/025* (2022.01)
*H04N 21/218* (2011.01)

(52) U.S. Cl.
CPC ......... *H04N 5/23206* (2013.01); *G06F 13/00* (2013.01); *H04L 67/025* (2013.01); *H04N 5/23222* (2013.01); *H04W 76/10* (2018.02); *H04N 21/218* (2013.01)

(58) Field of Classification Search
CPC ........ G06F 3/017; G06F 3/167; G06F 3/0304; G06F 3/1407; G06F 3/1423; G06F 3/1454; G06F 13/00; G06F 2203/0383; G09G 2370/16; H04N 5/23206; H04N 5/23222; H04N 21/4222; H04N 21/4223; H04N 21/42203; H04N 21/43637; H04L 29/08099; H04L 65/602; H04W 76/10
See application file for complete search history.

(56) References Cited

U.S. PATENT DOCUMENTS

| 8,581,991 | B1 | 11/2013 | Clemente | |
|---|---|---|---|---|
| 2010/0191859 | A1 | 7/2010 | Raveendran | |
| 2014/0022146 | A1* | 1/2014 | Thangadorai | G09G 5/12 345/2.3 |
| 2014/0096165 | A1* | 4/2014 | Bei | H04N 21/44209 725/81 |
| 2014/0120829 | A1* | 5/2014 | Bhamidipati | H04N 21/43637 455/3.06 |

(Continued)

*Primary Examiner* — Marsha D Banks Harold
*Assistant Examiner* — Dharmesh J Patel
(74) *Attorney, Agent, or Firm* — CKC & Partners Co., LLC

(57) ABSTRACT

A wireless camera includes a wireless signal transceiver device, a processor circuit, and a camera device. The processor circuit controls the wireless signal transceiver device to operate at a Miracast mode in response to a first command, in order to connect with an external device. The camera device shots an object to generate first video streaming data having a first format. Under the Miracast mode, the processor circuit repacks the first video streaming data as second video streaming data having a second format, and transmits the second video streaming data to the external device via the wireless signal transceiver device, and in order to display the second video streaming data by the external device.

20 Claims, 4 Drawing Sheets

(56) References Cited

U.S. PATENT DOCUMENTS

| | | | |
|---|---|---|---|
| 2014/0256407 A1* | 9/2014 | Graf | G07F 17/3225 |
| | | | 463/22 |
| 2014/0334381 A1* | 11/2014 | Subramaniam | H04N 21/4316 |
| | | | 370/328 |
| 2014/0365611 A1 | 12/2014 | Praveenkumar et al. | |
| 2019/0044989 A1 | 2/2019 | Veeramani et al. | |

* cited by examiner

WIRELESS CAMERA AND METHOD OF VIDEO STREAMING

CROSS-REFERENCE TO RELATED APPLICATION

This application claims priority to Taiwan Application Serial Number 108114025, filed Apr. 22, 2019, which is herein incorporated by reference in its entirety.

BACKGROUND

Technical Field

The present disclosure relates to a wireless camera and a method of video streaming, and in particular to a method of video streaming for a document camera having a Miracast mode and a WiFi mode.

Description of Related Art

Images captured by the existing camera can only be viewed instantly through a screen set on the camera. However, a size of the screen on the camera is typically small and not easy to view. If a user wants to view the captured image through an electronic device with a large screen, additional cost of developing software or an additional physical cable that is for transmitting the image to peripheral devices is required. In addition, the existing camera that supports wireless transmission can only operates as a wireless display sink (Miracast sink) to show images from other devices, and is unable to instantly show or transmit its captured images.

SUMMARY

An aspect of the present disclosure relates to a wireless camera. The wireless camera includes a wireless signal transmission device, a processing circuit and a camera device. The processing circuit configured to control the wireless signal transmission device to enter a Miracast mode in response to a first command, in order to connect with a first external device. The camera device configured to capture an object to generate first video stream data having a first format, in which under the Miracast mode, the processing circuit is further configured to repack the first video stream data into second video stream data having a second format, and the processing circuit transmits the second video stream data to the first external device via the wireless signal transmission device, in order to play the second video stream data by the first external device.

An aspect of the present disclosure relates to a method of video streaming, and the method of video streaming includes the following operations: in response to a first command, controlling a wireless signal transmission device of the wireless camera to enter a Miracast mode, in order to connect with a first external device; generating a first video stream data having a first format by the wireless camera taking an object; and under the Miracast mode, repackaging the first video stream data into a second video stream data having a second format, and transmitting the second video stream data to the first external device via the wireless signal transmission device, in order to play the second video stream data by the first external device.

An aspect of the present disclosure relates to a wireless camera. The wireless camera includes a wireless signal transmission device, a processing circuit and a camera device. The processing circuit configured to control the wireless signal transmission device to enter a Miracast mode in response to a first command, in order to connect with an external device. The camera device configured to capture an object to generate first video stream data, in which under the Miracast mode, the processing circuit is further configured to transmit a user input back channel parameter to the external device, in order to allow the external device to control an operation of at least one of the camera device, the processing circuit, or the wireless signal transmission device based on the user input back channel parameter.

As described above, the wireless camera and the method of video streaming provided in embodiments of the present disclosure can share captured images/videos with existing external devices via multiple modes, and provide reversed control to external devices, in order to improve the convenience of user operations and experience of user.

DETAILED DESCRIPTION

The terms used in this specification generally have their ordinary meanings in the art. The above vocabulary is defined in the commonly used dictionary, and any examples of the use of the vocabulary discussed herein are included in the description of the specification, and are not intended to limit the scope and meaning of the disclosure. Likewise, the disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

Figure 1:
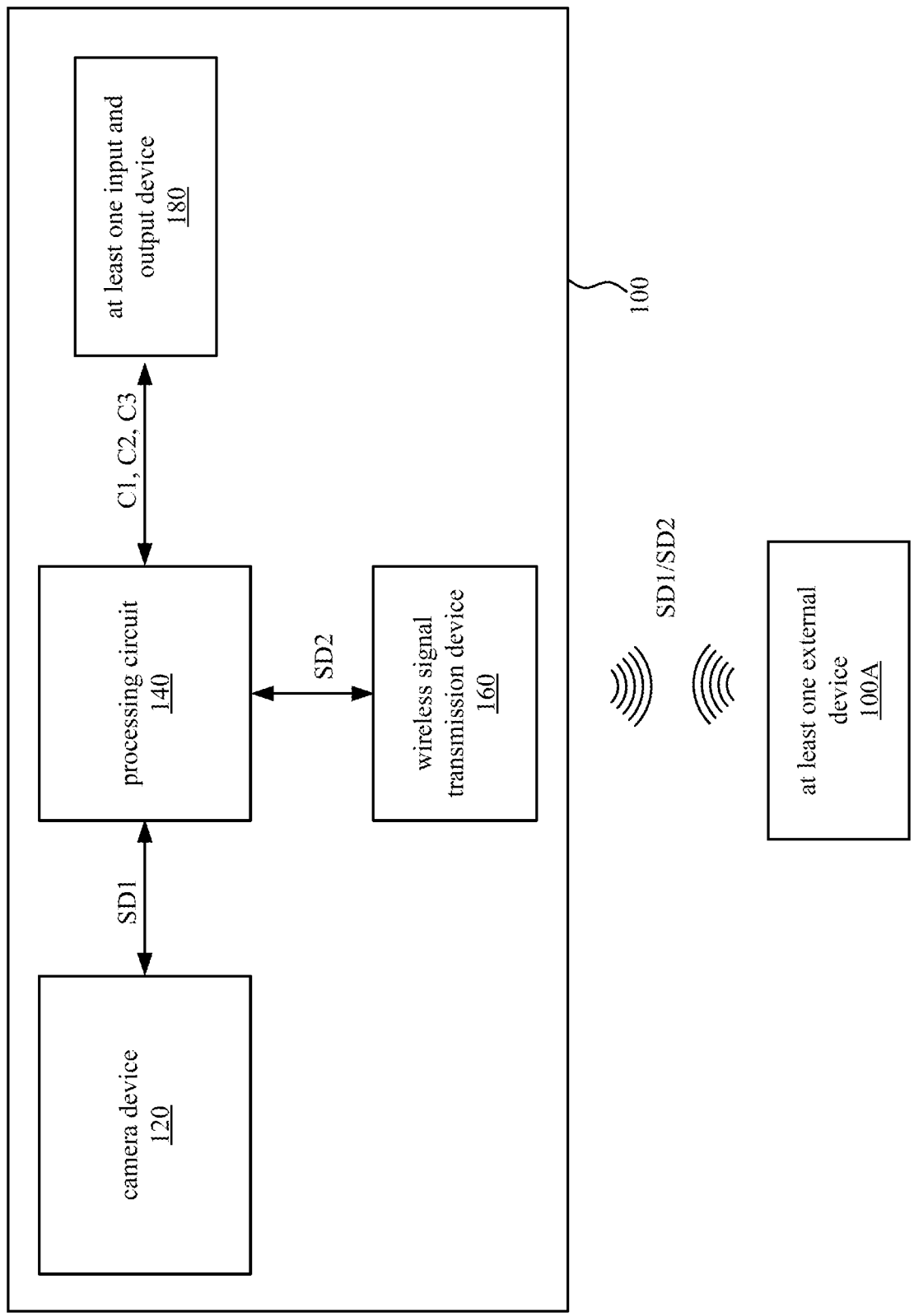
FIG. 1 shows a schematic diagram of a wireless camera according to some embodiments of the present disclosure.

Referring to FIG. 1, FIG. 1 shows a schematic diagram of a wireless camera according to some embodiments of the present disclosure. In some embodiments, the wireless camera 100 is a document camera. In some embodiments, the wireless camera 100 is not applied to devices such as smart phones and/or tablets.

As shown in FIG. 1, the wireless camera 100 includes a camera device 120, a processing circuit 140, a wireless signal transmission device 160, and at least one input and output (I/O) device 180.

In some embodiments, the camera device 120 is configured to shoot an object (e.g., people, item, etc.), in order to generate video stream data SD1. For example, the camera device 120 includes a camera (not shown) for shooting the object and an image processing circuit (not shown), in which the camera may be implemented by a hardware component such as a lens and a photo sensor, and the image processing circuit may be implemented by integrated circuits or chips such as a digital signal processing circuit and a codec circuit.

The at least one I/O device 180 may be manipulated by a user, in order to input one or more commands (e.g., commands C1 to C3 described later) to the processing circuit 140, in order to control the wireless camera 100. In some embodiments, the at least one I/O device may be implemented by a touch screen, in order to display an image captured by the wireless camera 100 and related user interface or on-screen display (OSD) information. In some embodiments, the at least one I/O device 180 may also be implemented by element(s) such as a remote control or at least one physical button. For example, the physical button may be arranged on the wireless camera 100, in order to be manipulated by the user. When the physical button is pressed, the wireless camera 100 enters a Miracast mode or a WiFi mode.

The above embodiments for at least one I/O device are for illustrative purposes, and the present disclosure is not limited thereto.

The processing circuit 140 is coupled to the camera device 120 to receive the video stream data SD1, and coupled to the at least one I/O device 180 to transmit the video stream data SD1 and/or receive one or more of the aforementioned commands. The processing circuit 140 is further coupled to the wireless signal transmission device 160. In some embodiments, the processing circuit 140 is configured to control the wireless signal transmission device 160 to enter the Miracast mode or the WiFi mode in response to the command C1 or the command C2, in order to connect with at least one external device 100A.

In some embodiments, the at least one external device 100A is an electronic device having a screen or a monitor (e.g., TV, web browsing, personal computer, Notebook computer, etc.). When the wireless camera 100 is operating under Miracast mode or WiFi mode, the image captured by the wireless camera 100 can be transmitted to the at least one external device 100A via the wireless signal transmission device 160, in order to display the image captured by the wireless camera 100 via the at least one external device 100A. The connection process will be explained in the following paragraphs.

In various embodiments, the processor 110 may be, but not limited to, a central processing unit (CPU), an application-specific integrated circuit (ASIC), a multiprocessor, a distributed processing system, or a suitable processing circuit. In some embodiments, various operations performed by processing circuit 140 may be encoded as at least one command in advance, and the at least one command is stored in a memory (not shown), and the processing circuit 140 may access the memory to execute the at least one command.

The wireless signal transmission device 160 may establish a wireless network connection with the at least one external device 100A based on the control of the processing circuit 140. In some embodiments, the wireless signal transmission device 160 can include circuit components such as a receiver circuit, a transmitter circuit, and/or a controller circuit. In some embodiments, the controller circuit may, based on the control of the processing circuit 140, drive the receiver circuit or the transmitter circuit to connect based on a connection file.

The foregoing embodiment of the wireless signal transmission device 160 is given for example, and the present disclosure is not limited thereto. The wireless signal transmission device 160 may be implemented by various suitable WiFi modules and/or WiFi transceiver circuits.

Figure 2:
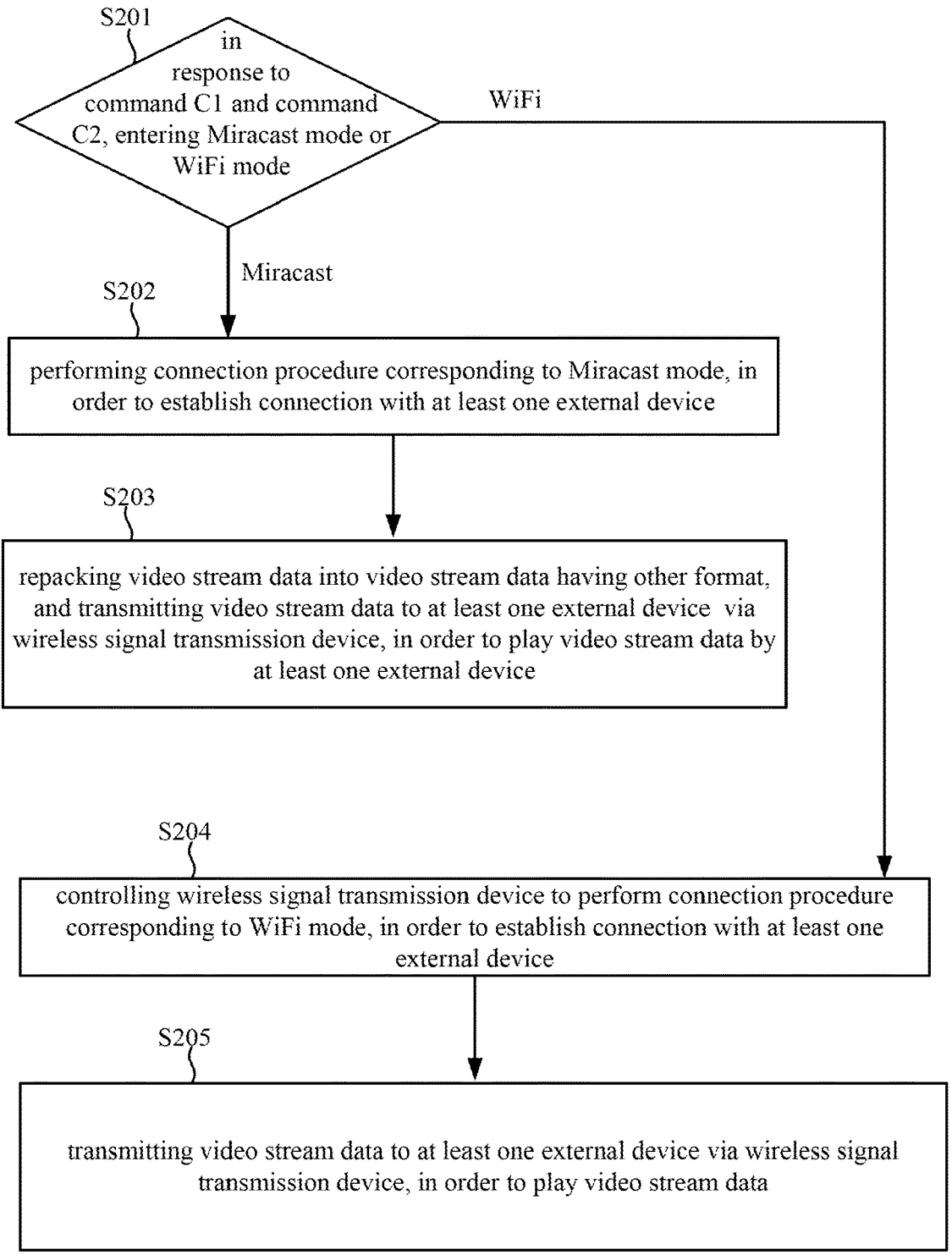
FIG. 2 shows a flow chart of a method of video streaming according to some embodiments of the present disclosure.

Referring to FIGS. 1 and 2, FIG. 2 shows a flow chart a method 200 of video streaming according to some embodiments of the present disclosure. In some embodiments, the method 200 of video streaming may be performed by the wireless camera 100 of FIG. 1.

In operation S201, in response to a command C1 and a command C2, the wireless camera 100 decides to enter the Miracast mode or the WiFi mode. If the wireless camera 100 enters the Miracast mode, operation S202 is performed. Alternatively, if the wireless camera 100 enters the WiFi mode, operation S204 is performed.

For example, the at least one I/O device 180 displays a function menu, in order to provide a selection of entering the Miracast mode or the WiFi mode for the user. When the Miracast mode is selected, the at least one I/O device 180 generates the command C1 to the processing circuit 140. Alternatively, when the WiFi mode is selected, the at least one I/O device 180 generates the command C2 to the processing circuit 140.

In operation S202, the wireless signal transmission device 160 performs a connection procedure corresponding to the Miracast mode, in order to establish a connection with the at least one external device 100A.

In operation S203, the processing circuit 140 repacks the video stream data SD1 into video stream data SD2 having other format, and transmits the video stream data SD2 to the at least one external device 100A via the wireless signal transmission device 160, in order to play the video stream data SD2 by the at least one external device 100A.

Figure 3:
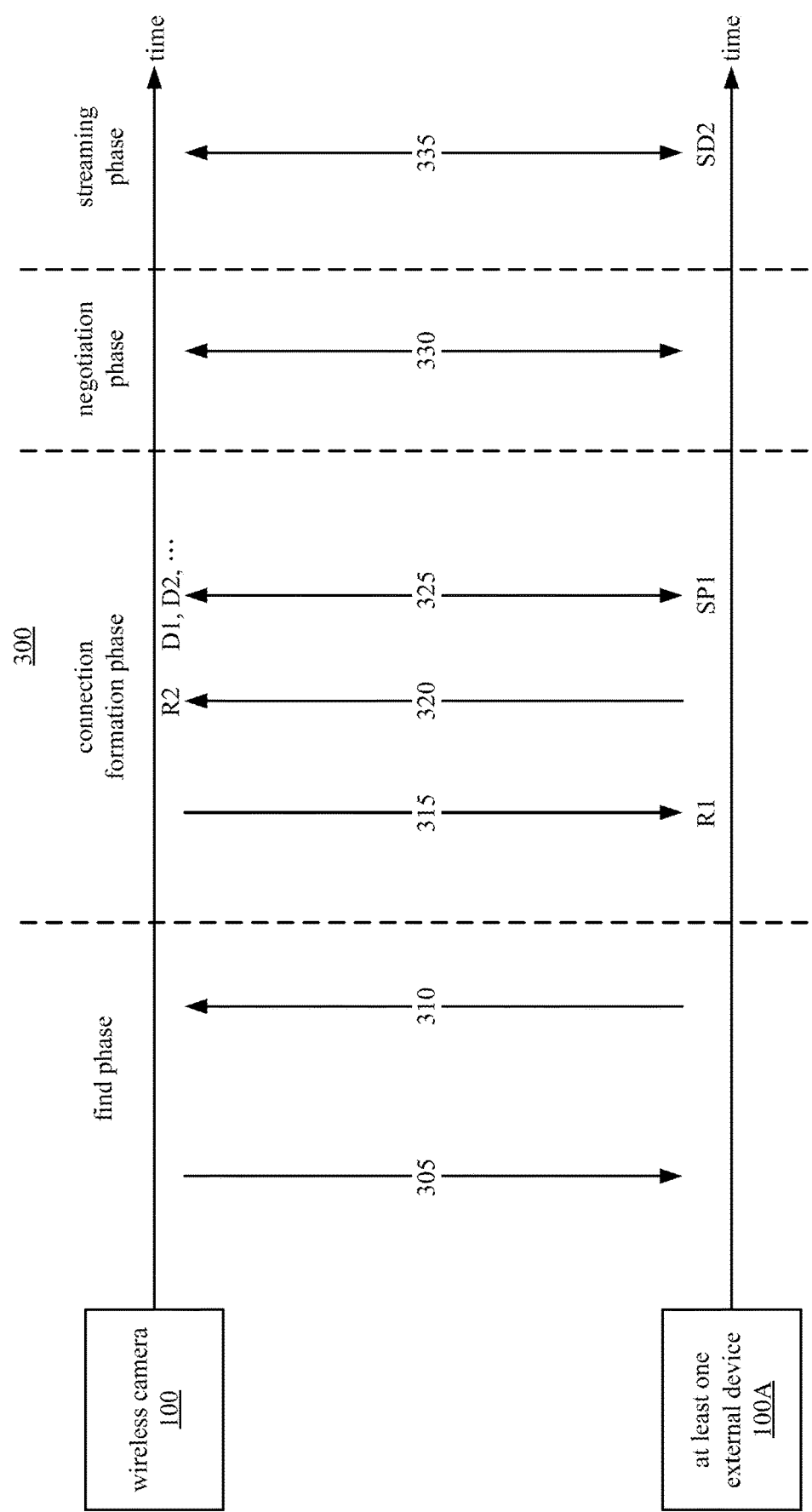
FIG. 3 shows a schematic diagram of a connection procedure under Miracast mode according to some embodiments of the present disclosure.

FIG. 3 shows a schematic diagram of the connection procedure under Miracast mode according to some embodiments of the present disclosure. For ease of understanding, operation S202 of FIG. 2 will be described below with reference to FIG. 3.

In operation S202, as shown in FIG. 3, in response to the command C1, the processing circuit 140 activates a peer-to-peer function of the wireless signal transmitting device 160 to perform a detection procedure. In some embodiments, the aforementioned peer-to-peer function may be WiFi-Direct. In some embodiments, the detection process includes a find phase.

For example, in response to the command C1, the wireless signal transmission device 160 performs a device discovery on at least one specific channel, in order to detect whether there is another device entering the Miracast mode in the current operating environment (i.e., operation 305). If the at least one external device 100A is listening on the at least one specific channel, the at least one external device 100A and the wireless signal transmission device 160 may detect each other, in order to confirm that there is another device entering the Miracast mode in the current operating environment (i.e., operation 310). Under this condition, the processing circuit 140 may show information of the at least one external device 100A to the user via the at least one I/O device 180.

If the user determines that the wireless camera 100 is to be connected with the at least one external device 100A, the user may select the at least one external device 100A via the at least one I/O device 180. In response to this selection, the at least one I/O device 180 generates a command C3 to the processing circuit 140. Accordingly, the processing circuit 140 controls the wireless signal transmission device 160 to issue a connection request R1 to the at least one external device 100A in response to the command C3 (i.e., operation 315), and enters a connection formation phase. The at least one external device 100A generates a response R2 to the connection request R1 (i.e., operation 320). After the wireless signal transmission device 160 receives the response R2, both the wireless signal transmission device 160 and the at least one external device 100A will determine a group owner (GO) by negotiation (i.e., operation 325), in order to establish a connection. The above negotiation may determine that one party operates as a GO to establish a WiFi direct access point via one or more connection parameters (e.g., intent value), and may complete the connection by exchanging passwords via protocols such as WiFi simple configuration (WSC).

In some embodiments, in the connection formation phase, the processing circuit 140 further transmits at least one device parameter associated with the wireless camera 100 to the at least one external device 100A. The at least one device parameter may include a device identification code, component control parameters, connection settings, and the like.

In some embodiments, the at least one device parameter includes a user input back channel parameter SP1. The at least one external device 100A confirms that the wireless camera 100A supports a function of reversed control based on the user input back channel parameter SP1. Accordingly, the at least one external device 100A may send an command based on the user input back channel parameter SP1, in order to control operations of various components in the wireless camera 100 (e.g., at least one of the camera device 120, the processing circuit 140, or the wireless signal transmission device 160, etc.). For example, the at least one external device 100A may send a command to adjust related setting (s) of the wireless camera 100 (e.g., focus, resolution, or shooting position of the camera device 120), but the present disclosure is not limited thereto.

In some embodiments, after the connection is established, the processing circuit 140 is further configured to store the device information D1 and the connection information D2 of the at least one external device 100A to a memory (not shown). Thus, at the next connection, the wireless camera 100 may be directly connected to the at least one external device 100A based on the device information D1 and the connection information D2. In some embodiments, the device information D1 includes at least one device signal of the external device 100A, a media access control (MAC) address, etc., but the present disclosure is not limited thereto. In some embodiments, the connection information D2 includes domain name, password, etc., but the present disclosure is not limited thereto.

Referring to FIG. 3, in a negotiation phase, the wireless signal transmission device 160 establishes a real time streaming protocol (RTSP) negotiation, in order to confirm the device capabilities of the at least one external device 100A (i.e., operation 330). In a streaming phase, the processing circuit 140 may start transmitting the video stream data SD2 to the at least one external device 100A based on the real time streaming protocol, in order to play the video stream data SD2 (i.e., operation 335).

Figure 4:
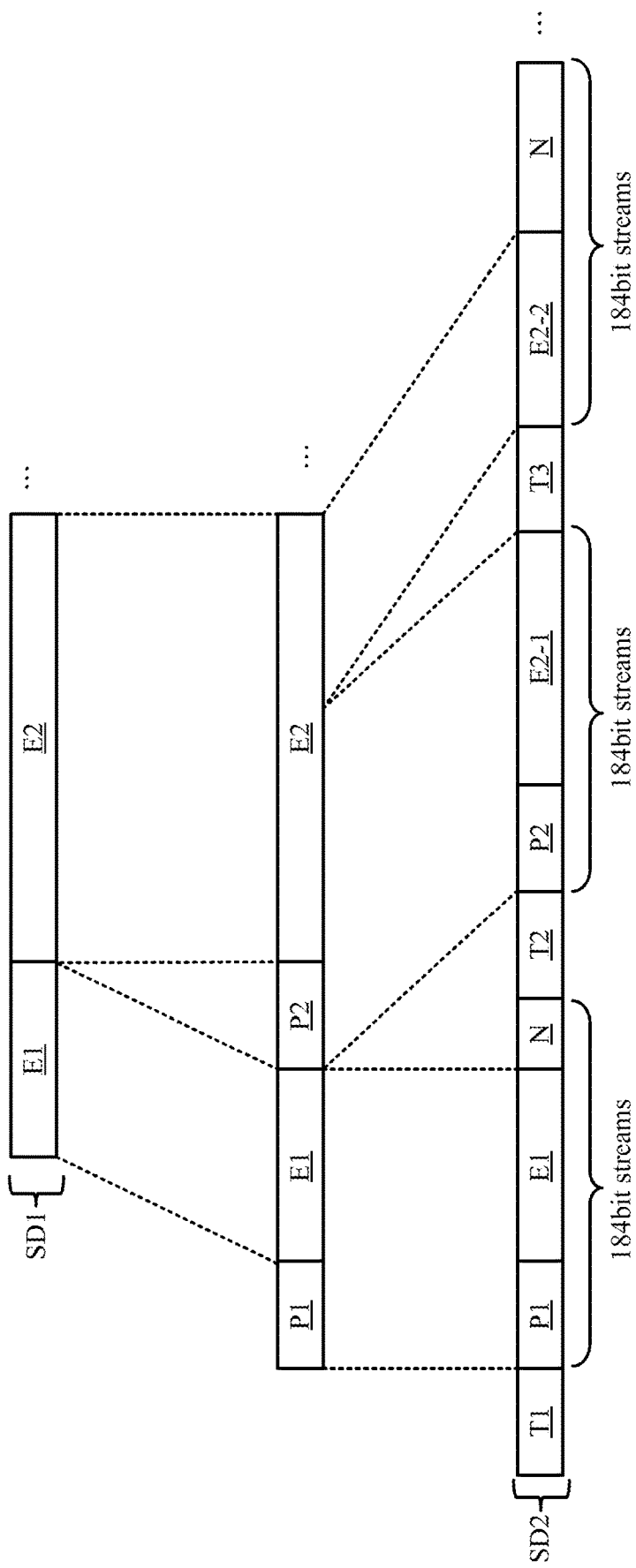
FIG. 4 shows a schematic diagram of an operation of repackaging video stream data according to some embodiments of the present disclosure.

Referring to FIG. 4, FIG. 4 shows a schematic diagram of an operation of repacking video stream data according to some embodiments of the present disclosure. As previously described in operation S203, Under the Miracast mode, the processing circuit 140 repacks the video stream data SD1 into the video stream data SD2. For example, in some applications, the format of the video stream data SD1 is an H.264 elementary stream. As shown in FIG. 4, the video stream data SD1 includes multi-segment bit streams E1 and E2, which respectively correspond to images of two different time segments.

In order to comply with the MPEG-2 Transport Stream (TS) format supported by Miracast mode, the processing circuit 140 may insert headers P1 and P2 of the packetized basic bit stream between the multi-segment bit streams E1 and E2. The processing circuit 140 may insert headers T1 to T3 of the TS to the above bit stream, and divides the multi-segment bit streams E1 or E2 and/or adds null data N to conform to the data length required by the MPEG-2 format (e.g., 184 bytes). For example, the bit stream E2 is divided into two-segment bit streams E2-1 and E2-2. The data length of the bit stream E2-1 and the header P2 is 184 bytes, and the data length of the bit stream E2-2 and the null data N is 184 bytes. Accordingly, the repacked bit stream may be transmitted as video stream data SD2 to the at least one external device 100A.

Referring to FIG. 2, in operation S204, the processing circuit 140 controls the wireless signal transmission device 160 to perform a connection procedure corresponding to the WiFi mode, in order to establish a connection with the at least one external device 100A. In operation S205, the processing circuit 140 transmits the video stream data SD1 to the at least one external device 100A via the wireless signal transmission device 160, in order to play the video stream data SD1.

For example, a user can set information of a WIFI network information via the at least one I/O device 180. For example, the information may include, for example, a service setting identifier (SSID) and a password. The processing circuit 140 controls the wireless signal transmission device 160 to connect to local area network based on the above information, and to establish a virtual streaming server for RTSP. Accordingly, the at least one external device 100A may be connected to the virtual streaming server via a software supporting RTSP, in order to play the video stream data SD1.

In some embodiments, the aforementioned at least one external device 100A may include one or more different electronic devices. For example, the at least one external device 100A may include a smart TV configured with a Miracast mode and a computer host or a notebook computer that is able to be installed with software supporting RTSP. Explained in another way, by configuring two different transmission modes, the wireless camera 100 of the present disclosure is able to perform the video streaming with various types of existing electronic devices.

Operations of the above described method of video streaming 200 are merely examples, and are not limited to be performed in the order of this example. Various operations under the method of video streaming 200 may be appropriately added, replaced, omitted, or performed in a different order, without departing from the operation and scope of the embodiments of the present disclosure.

In some embodiments, the method of video streaming 200 may be implemented as an application program carried on a non-transitory computer readable medium. In some embodiments, the method of video streaming 200 may be implemented by hardware, software, firmware, or any combination thereof. For example, if speed and accuracy are paramount, the method of video streaming 200 may be implemented primarily by hardware and/or firmware. Alternatively, if design flexibility is paramount, the method of video streaming 200 may be implemented primarily by software. The above implementations are given as example, and the present disclosure is not limited thereto.

As described above, the wireless camera and the method of video streaming provided in embodiments of the present disclosure can share captured images/videos with existing external devices via multiple modes, and provide reversed control to the external devices, in order to improve the convenience of user operations and experience of user.

Although the present disclosure has been disclosed in the above embodiments, but it is not limited thereto. Anyone who is familiar with this skill can make various changes and refinements without departing from the spirit and scope of this disclosure. Therefore, the scope of protection of this disclosure is subject to the definition of the scope of the patent application attached.

What is claimed is:

1. A wireless camera, comprising:
   a wireless signal transmission device;
   a processing circuit configured to control the wireless signal transmission device to enter a Miracast mode in response to a first command, in order to connect with a first external device; and
   a camera device configured to capture an object to generate first video stream data having a first format,
   wherein under the Miracast mode, the processing circuit is further configured to repack the first video stream data into second video stream data having a second format, and the processing circuit transmits the second video stream data to the first external device via the wireless signal transmission device, in order to play the second video stream data by the first external device;
   wherein the processing circuit is further configured to control the wireless signal transmission device to issue a connection request to the at least one external device, and the wireless signal transmission device is further configured to determine a group owner by negotiating with the at least one external device in response to receiving a response from the at least one external device in order to establish a connection with the at least one external device.

2. The wireless camera of claim 1, wherein the processing circuit is configured to control the wireless signal transmission device to perform a detection procedure in response to the first command, in order to detect the first external device.

3. The wireless camera of claim 2, wherein if the first external device is detected, the processing circuit is further configured to send the connection request to the first external device via the wireless signal transmission device in response to a second command, and if the processing circuit receives the response from the first external device to the connection request, the processing circuit is configured to control the wireless signal transmission device to establish the connection with the first external device under the Miracast mode.

4. The wireless camera of claim 3, wherein the processing circuit is configured to transmit at least one device parameter to the first external device, the at least one device parameter comprises a user input back channel parameter, and the first external device is further configured to control an operation of at least one of the camera device, the processing circuit, or the wireless signal transmission device based on the user input back channel parameter.

5. The wireless camera of claim 3, wherein the after the connection is established, the processing circuit is further configured to record a device information and a connection information of the first external device, in order to establish a next connection with the first external device directly based on the device information and the connection information.

6. The wireless camera of claim 3, further comprising:
   at least one input and output device configured to generate the first command and the second command to the processing circuit, and configured to display related information of the first external device based on the response from the first external device.

7. The wireless camera of claim 1, wherein the first format is an H.264 elementary stream, and the second format is an MPEG-2 transport stream.

8. The wireless camera of claim 1, wherein the processing circuit is further configured to control the wireless signal transmission device to enter a WiFi mode in response to a second command, in order to connect with a second external device.

9. The wireless camera of claim 8, wherein under the WiFi mode, the processing circuit transmits the first video stream data to the second external device via the wireless signal transmission device, in order to play the first video stream data by the second external device.

10. A method of video streaming, applied to a wireless camera, and the method of video streaming comprising:
    in response to a first command, controlling a wireless signal transmission device of the wireless camera to enter a Miracast mode, in order to connect with a first external device;
    generating a first video stream data having a first format by the wireless camera taking an object;
    under the Miracast mode, repackaging the first video stream data into a second video stream data having a second format, and transmitting the second video stream data to the first external device via the wireless signal transmission device, in order to play the second video stream data by the first external device;
    sending a connection request to the first external device via the wireless signal transmission device; and
    in response to receiving a response from the first external device, negotiating with the first external device and determining a group owner.

11. The method of video streaming of claim 10, wherein controlling the wireless signal transmission device of the wireless camera to enter the Miracast mode comprising:
    in response to a first command, controlling the wireless signal transmission device to perform a detection procedure, in order to detect the first external device.

12. The method of video streaming of claim 11, further comprising:
    if the first external device is detected, in response to a second command, sending the connection request to the first external device via the wireless signal transmission device; and
    if the response from the first external device to the connection request is received, the wireless signal transmission device establishes the connection with the first external device under the Miracast mode.

13. The method of video streaming of claim 12, further comprising:
    transmitting at least one device parameter to the first external device,
    wherein the at least one device parameter comprises a user input back channel parameter, and the first external device is further configured to control an operation of the wireless camera based on the user input back channel parameter.

14. The method of video streaming of claim 12, further comprising:
    after the connection is established, recording device information and connection information of the first external device, in order to establish a next connection with the first external device directly based on the device information and the connection information.

15. The method of video streaming of claim 12, further comprising:

generating the first command and the second command through at least one input and output device, and displaying related information of the first external device based on the response from the first external device.

16. The method of video streaming of claim 10, wherein in the first format is an H.264 elementary stream, and the second format is an MPEG-2 transport stream.

17. The method of video streaming of claim 10, further comprising:
in response to a second command, controlling the wireless signal transmission device to enter a WiFi mode, in order to connect with a second external device.

18. The method of video streaming of claim 17, further comprising:
under the WiFi mode, transmitting the first video stream data to the second external device via the wireless signal transmission device, in order to play the first video stream data by the second external device.

19. A wireless camera, comprising:
a wireless signal transmission device;
a processing circuit configured to control the wireless signal transmission device to enter a Miracast mode in response to a first command, in order to connect with an external device; and
a camera device configured to capture an object to generate first video stream data,
wherein under the Miracast mode, the processing circuit is further configured to transmit a user input back channel parameter to the external device, in order to allow the external device to control an operation of at least one of the camera device, the processing circuit, or the wireless signal transmission device based on the user input back channel parameter, and the operation of at least one of the camera device, the processing circuit, or the wireless signal transmission device is configured to adjust focus, resolution, or shooting position of the camera device.

20. The wireless camera of claim 19, wherein under the Miracast mode, the processing circuit is further configured to repack the first video stream data into second video stream data, and the processing circuit transmits the second video stream data to the external device via the wireless signal transmission device, in order to play the second video stream data by the external device, wherein the format of the first video stream data is an H.264 elementary stream, and the format of the second video stream data is an MPEG-2 transport stream.

* * * * *